(12) United States Patent
Van Putten et al.

(10) Patent No.: US 9,910,287 B2
(45) Date of Patent: Mar. 6, 2018

(54) AUTOSTEREOSCOPIC DISPLAY DEVICE HAVING A TRANSPARENT MODE OF OPERATION

(71) Applicant: KONINKLIJKE PHILIPS N.V., Eindhoven (NL)

(72) Inventors: Eibert Gerjan Van Putten, Eindhoven (NL); Mark Thomas Johnson, Eindhoven (NL); Olexandr Valentynovych Vdovin, Eindhoven (NL); Bart Kroon, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 344 days.

(21) Appl. No.: 14/437,356

(22) PCT Filed: Oct. 18, 2013

(86) PCT No.: PCT/IB2013/059439
§ 371 (c)(1),
(2) Date: Apr. 21, 2015

(87) PCT Pub. No.: WO2014/064588
PCT Pub. Date: May 1, 2014

(65) Prior Publication Data
US 2015/0293369 A1 Oct. 15, 2015

Related U.S. Application Data

(60) Provisional application No. 61/718,819, filed on Oct. 26, 2012, provisional application No. 61/727,166, filed on Nov. 16, 2012.

(51) Int. Cl.
*G02B 27/22* (2006.01)
*G02B 27/26* (2006.01)
*H04N 13/04* (2006.01)

(52) U.S. Cl.
CPC .......... *G02B 27/26* (2013.01); *G02B 27/2214* (2013.01); *H04N 13/0404* (2013.01); *H04N 13/0452* (2013.01); *H04N 13/0456* (2013.01)

(58) Field of Classification Search
CPC .... G02B 27/2214; G02B 27/26; G02B 27/22; H04N 13/0404; H04N 13/0409;
(Continued)

(56) References Cited

U.S. PATENT DOCUMENTS 7,058,252 B2 * 6/2006 Woodgate .......... G02B 27/2214
348/E13.029
2004/0160538 A1 * 8/2004 Li ........................ C09K 19/544
349/16

(Continued)

FOREIGN PATENT DOCUMENTS

| EP | 0833183 A1 | 4/1998 |
| WO | 2003015424 A2 | 2/2003 |
| WO | 2012038876 A1 | 3/2012 |

*Primary Examiner* — Bumsuk Won
*Assistant Examiner* — Balram Parbadia (57) ABSTRACT

A display device has a first, see-through mode of operation (30), (34) in which the display panel does not emit light and the display device blocks the light of a first polarization (state A) but allows light of a second polarization (state B) to pass through in both opposite directions. In a second, 3D display mode, the emissive pixels output light of the first polarization (state A) from the display output face and a view forming arrangement forms multiple views (36) in one output direction.

14 Claims, 4 Drawing Sheets

(58) Field of Classification Search
CPC ........... H04N 13/0452; H04N 13/0456; H04N 13/0454; G02F 1/133526; G02F 1/13362; G02F 2203/07; G09G 3/003
See application file for complete search history.

(56) References Cited

U.S. PATENT DOCUMENTS

| | | | | |
|---|---|---|---|---|
| 2007/0165305 | A1* | 7/2007 | Mehrle | G02B 27/2214 359/464 |
| 2009/0167968 | A1* | 7/2009 | Hsu | G02B 27/2214 349/15 |
| 2010/0097293 | A1* | 4/2010 | McMahon | B60K 35/00 345/1.1 |
| 2011/0122128 | A1* | 5/2011 | Akita | G02B 27/2214 345/419 |
| 2011/0317129 | A1* | 12/2011 | Hsu | G02B 27/26 353/8 |
| 2012/0001184 | A1 | 1/2012 | Ha | |
| 2012/0092339 | A1 | 4/2012 | Pijlman | |
| 2012/0314024 | A1* | 12/2012 | Tsang | G09G 3/003 348/43 |
| 2013/0127980 | A1* | 5/2013 | Haddick | G06F 3/013 348/14.08 |

\* cited by examiner

AUTOSTEREOSCOPIC DISPLAY DEVICE HAVING A TRANSPARENT MODE OF OPERATION

CROSS-REFERENCE TO PRIOR APPLICATIONS

This application is the U.S. National Phase application under 35 U.S.C. § 371 of International Application No. PCT/IB2013/059439, filed on Oct. 18, 2013, which claims the benefit of U.S. Provisional Patent Application No. 61/718,819, filed on Oct. 26, 2012 and U.S. Provisional Patent Application No. 61/727,166, filed on Nov. 16, 2012. These applications are hereby incorporated by reference herein.

FIELD OF THE INVENTION

This invention relates to an autostereoscopic display device with a display panel having an array of display pixels, and an arrangement for directing different views to different physical locations. The invention relates in particular to transparent displays, which can for example function as a window when turned off.

BACKGROUND OF THE INVENTION

Autostereoscopic display devices are well known. A most common example comprises a two dimensional emissive liquid crystal display panel having a row and column array of display pixels acting as an image forming means to produce a display. An array of elongate lenticular lenses extending parallel to one another overlies the display pixel array and acts as a view forming means. Outputs from the display pixels are projected through these lenticular lenses, which function to modify the directions of the outputs.

The lenticular lenses are provided as a sheet of elements, each of which comprises an elongate semi-cylindrical lens element. The lenticular lenses extend in the column direction of the display panel, with each lenticular lens overlying a respective group of two or more adjacent columns of display pixels.

If lenticular lens is associated with two columns of display pixels, the display pixels in each column provide a vertical slice of a respective two dimensional sub-image. The lenticular sheet projects these two slices, and corresponding slices from the display pixel columns associated with the other lenticular lenses, to the left and right eyes of a user positioned in front of the sheet, so that the user observes a single stereoscopic image.

In other arrangements, each lenticular lens is associated with a group of three or more adjacent display pixels in the row direction. Corresponding columns of display pixels in each group are arranged appropriately to provide a vertical slice from a respective two dimensional sub-image. As a user's head is moved from left to right a series of successive, different, stereoscopic views are observed creating, for example, a look-around impression.

Another example of an imaging arrangement for use in this type of display is a barrier, for example with slits that are sized and positioned in relation to the underlying pixels of the display. In a two-view design, the viewer is able to perceive a 3D image if his/her head is at a fixed position. The barrier is positioned in front of the display panel and is designed so that light from the odd and even pixel columns is directed towards the left and right eye of the viewer, respectively.

According to a newly released "*Transparent Display Technology and Market Forecast*" report by Displaybank, transparent displays would debut the market for the first time in 2012 and sharply grow to create a $87.2 billion market by the year 2025, taking some market share from traditional flat panel displays, but also increasing the overall size of the market.

A transparent display is a type of display that has the characteristic of showing the background behind the display because the display itself has a certain level of transmittance. Transparent displays have many possible applications such as windows for buildings or automobiles and the display window in shopping malls.

There is not yet any technology for providing the proposed transparent displays with 3D viewing capability, and in particular not using the glasses-free lenticular lens or parallax barrier 3D approaches outlined above. A problem arises when attempting to combine a lenticular lens or a parallax barrier on top of a conventional transparent display. Not only the light generated by the display, but also the light transmitted through the display is affected by the lenticular lens or the parallax barrier preventing an undistorted view of the image behind the display.

SUMMARY OF THE INVENTION

The invention is defined in the independent claims.

According to the invention, there is provided a display device and method as defined in the independent claims.

The invention provides a display device comprising:

an emissive display panel having a display output face;

a polarization-sensitive view forming arrangement over the display output face, for directing light of a given first polarization from different pixels into different directions thereby enable multiple views to be displayed in different directions simultaneously, wherein the view forming arrangement passes light of a second orthogonal polarization without significant change of direction;

a polarization filter for blocking light of the first polarization arranged behind the display output face, wherein the display device has at least two modes of operation:

a first, see-through mode of operation in which the display panel does not emit light and the display device blocks the light of the first polarization but allows light of the second polarization to pass through in both opposite directions; and a second, 3D display mode in which the emissive pixels output light of the first polarization from the display output face and the view forming arrangement forms multiple views in one output direction.

The view forming arrangement only affects one polarization state of the light, the first state. The second polarization state, perpendicular to the first, can propagate undisturbed through the view forming arrangement. In this way, when the emissive display is turned off, a see-through mode of operation is enabled. By turning on the display, the 3D mode is enabled. In this mode light only outputs the display from one side because the first polarization is blocked by the polarization filter behind the display.

The invention thus provides a display in which an observer can properly see 3D-content from the display in the 3D display mode and an undistorted view of the scenery behind the display in the pass through mode.

Different designs enable different display effects. For example the 3D mode can present only the 3D display output, or else a view of the rear scenery can be combined with the 3D view overlaid.

In a first set of examples, the emissive display panel comprises an array of spaced apart pixels, wherein the pixel area is less than 50% (and preferably less than 30%, or even 20% or even 10%) of the total display area. This spacing then provides the transparency of the display to the light of the second polarization in the see-through mode. The pixels can comprise an output polarizer for blocking light of the second polarization to ensure that the pixel output is of the first polarization. In this way, the pixels do block light in the see-through mode, and thus a small pixel aperture is desired.

This arrangement combines the see through aspect with the active display output, when in the 3D mode. Thus, the viewer can see the display content (e.g. an advert) as well as the scene behind the display (e.g. actual goods in a shop).

In one version, the view forming arrangement comprises a lenticular lens arrangement having birefringent lens elements and a replica arrangement, arranged such that a lensing function is provided at the lens element and replica interface only for light of the first polarization.

In another version, the view forming arrangement comprises an arrangement of barrier elements, wherein the barrier elements are formed as polarizers which block light of the first polarization. By using barriers which are polarizers, they only function as barriers for the first polarization, i.e. for the 3D mode.

In a second set of examples, the emissive display panel comprises an array of spaced apart pixels, wherein the pixel area is more than 60% (or even more than 70%) of the total display area, and wherein the display panel comprises switchable polarizers on each side of a light emissive layer.

In this arrangement, the pixels cover all (or nearly all) of the display area. They need to pass light of the second polarization when in the pass through mode. For this purpose, in the first, see-through mode of operation, the switchable polarizers block light of the first polarization and in the second, 3D display mode, the switchable polarizers block light of the second polarization.

In this example, the 3D mode does not combine with a see through function, because there are two opposite polarizers. Thus, on one side there is a normal 3D display mode, and on the opposite side the display is black.

This arrangement can be used with a third, dual direction 2D mode of operation, in which the switchable polarizers block light of the first polarization and the display panel is controlled to display a single 2D image.

This 2D image is emitted in front and behind the display.

Again, for this second set of examples, the view forming arrangement can comprise a lenticular lens arrangement or an arrangement of barrier elements.

In all examples, one of the first and second polarizations can comprise linearly horizontally polarized and the other can comprise linearly vertically polarized. Alternatively, one of the first and second polarizations can comprise clockwise circularly polarized and the other can comprise counter-clockwise circularly polarized.

The invention also provides a method of operating a display device, the device comprising:

an emissive display panel having a display output face;

a polarization-sensitive view forming arrangement over the display output face, for directing light of a given first polarization from different pixels into different directions thereby enable multiple views to be displayed in different directions simultaneously, wherein the view forming arrangement passes light of a second orthogonal polarization without significant change of direction;

a polarization filter for blocking light of the first polarization arranged behind the display output face, wherein the method comprises at different times operating the display device in at least two modes of operation:

a first, see-through mode of operation in which the display panel does not emit light and the display device blocks the light of the first polarization but allows light of the second polarization to pass through in both opposite directions; and a second, 3D display mode in which the display panel outputs light of the first polarization from the display output face and the view forming arrangement forms multiple views in one output direction.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a display device which has a first, see-through mode of operation in which the display panel does not emit light and the display device blocks the light of a first polarization but allows light of a second polarization to pass through in both opposite directions. In a second, 3D display mode, the emissive pixels output light of the first polarization from the display output face and a view forming arrangement forms multiple views in one output direction.

A detailed description of two embodiments of the invention which both use lenticular lenses will first be given. Then, it will be shown how these embodiments can be simply modified to use parallax barriers.

Figure 1:
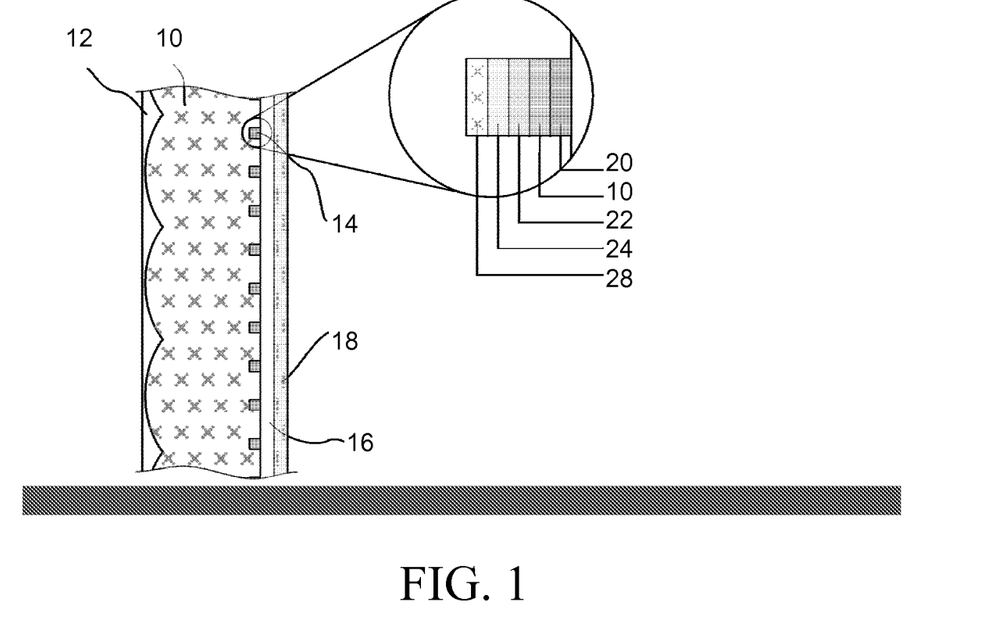
FIG. 1 shows a first example of display device according to the invention.

FIG. 1 shows a first embodiment of the structure of a display device in accordance with the invention.

The aim of this embodiment is that an observer standing on the left can see both 3D content generated by the display and the scenery on the right side undisturbed. An observer standing on the right can also see the scenery on the left undisturbed but cannot see any 3D content. A typical application could be an interactive shop window, a public information display, an interactive advertisement display, or a transparent computer screen. The display comprises a birefringent lenticular lens 10 with a replica 12 to the lens on top of it. The refractive index of the replica is equal to one of the refractive indices of the birefringent material of the lens. In that way, the combination of the lens and replica will act as a lenticular lens for one polarization state and as a normal spacer layer for the other polarization state orthogonal to it.

The pixels 14 are smaller than the typical spacing between them, thereby leaving empty areas that are filled with the same material as the birefringent lenticular lens 10. The whole stack of display pixels 14, lens 10 and replica 12 can be placed onto a transparent substrate 16 with a polarizer layer 18.

In the application of an interactive shop window or a public information display, this substrate 16 is actually the glass window.

The polarizer 18 can be an absorbing polarizer, or it could be a reflecting polarizer.

Just as in other autostereoscopic displays, there are multiple variations possible for implementing the lenticular lens. Alternatives can be a stack with the curved lens surface on the outside such as shown in FIG. 1, a solid stack with a flat outside, or any other lens stack.

The structure of the pixels 14 is shown in expanded form in FIG. 1. The pixels comprise a stack of an absorber 20 (which is optional), a reflector 22 that can also act as the bottom electrode, an emitter 24, which could be for example an organic light emitting diode (OLED) structure, a transparent top electrode 26 and a top polarizer 28. The top polarizer is preferably reflecting, but it could also be an absorbing polarizer.

The absorber 20 absorbs any light that is transmitted through the polarizer 18 and which hits the pixel, thereby reducing the visibility of the pixels for an observer on the right side. The reflector 22 directs the emission from the emitter 24 towards the left side to optimize the light output towards that side.

The polarizer 28 ensures that any light leaving the pixel is properly polarized The operation of the device will now be explained. The device uses two different polarization states. One polarization, state A, is used to generate 3D-content, and an orthogonal polarization, state B, is used to transmit any light undisturbed between the left side and the right side.

Two possible examples of these polarization states are:

Example 1 state A=linearly horizontally polarized
state B=linearly vertically polarized

Figure 2:
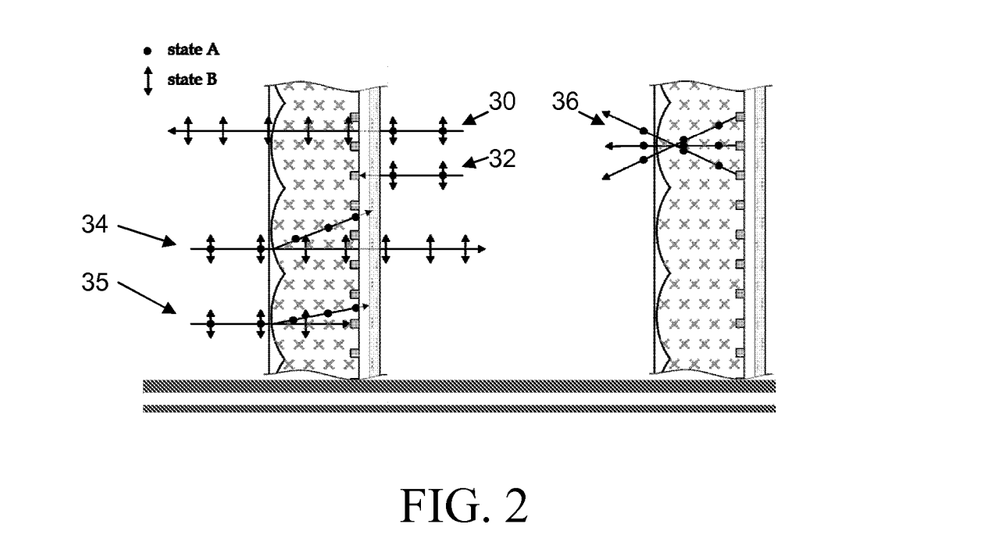
FIG. 2 shows the different modes of operation of the device of FIG. 1.

Example 2 state A=clockwise circularly polarized
state B=counter-clockwise circularly polarized In the figures below dashed crosses and dashed lines are used to indicate how an optical element works on a specific polarisation. For clarity and to avoid confusion the relation between the crosses and lines in the figures and the polarizations is as follows:
(i) Dashed crosses indicate that the element works on polarization state A, which means:
Polarisers transmit state A and absorb/reflect state B
State A effectively sees the birefringent lens+replica as a lenticular lens
State B effectively sees the birefringent lens+replica as a spacer
(ii) Dashed lines indicate that the element works on polarization state B, which means:
Polarisers transmit state B and absorb/reflect state A
State B effectively sees the birefringent lens+replica as a lenticular lens
State A effectively sees the birefringent lens+replica as a spacer FIG. 2 shows how light interacts with the structure. A 'see-through' mode is shown on the left and the 3D mode is shown on the right.

For the see-through mode, the case is first considered where the object is on the right and the observer on the left. The lens is shown with dashed crosses, so it lenses state A and passes state B. The polarizer is shown with dashed lines, so it absorbs state A. State A is represented by an axis into/out of the page as shown by a dark dot, and State B is represented by a vertical axis. This is clear from the key to FIG. 2.

Ray 30 passes from right to left. Polarization state B of ray 30 can propagate effectively undisturbed through the structure while polarization state A is blocked by the polarizer 18. If the light is incident exactly at the position of a pixel 14 as shown by ray 32, the absorbing part of the pixel will absorb the light. A user standing on the left can see the complete scenery on the right undisturbed except for the positions where the pixels are, which will look as dark spots. For this reason, the pixels are small compared to the typical pitch between the pixels.

When the observer is standing on the right while the object is on the left, the light ray 34 is relevant. State B of ray 34 can still propagate undisturbed through the structure. State A will be refracted by the lenticular lens, but cannot reach the observer because the polarizer 18 absorbs state A.

As shown by ray 35, when the incident light falls exactly on a pixel 14 the light will be reflected back to the object or absorbed by the polarizer in the pixel (depending on whether an absorbing or reflecting polarizer is used).

For the 3D mode, only an observer standing on the left side of the structure can see the displayed image. The way the pixels are constructed ensures that only light of state A will be emitted. This light, rays 36, is refracted by the lenticular lens generating several different views, in the same way as for known autostereoscopic displays using a lenticular lens function.

The see-through mode and the 3D mode co-exist. In this way the structure can overlay 3D content on top of real content which is on the other side of the structure.

The design of the lenticular lens and the driving of the pixels can be carried out using the same approach as for known autostereoscopic displays.

Figure 3:
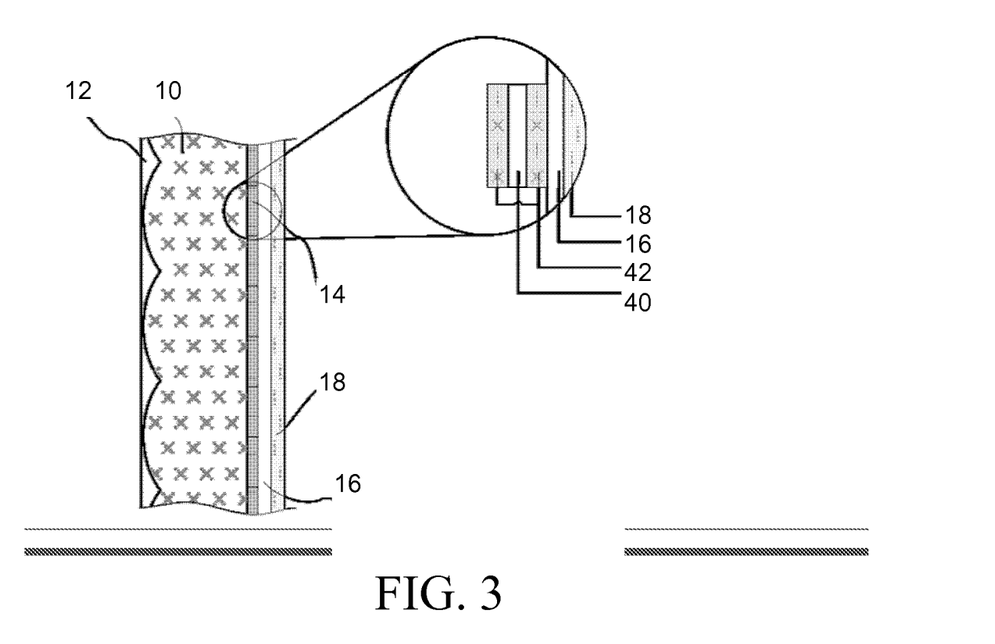
FIG. 3 shows a second example of display device according to the invention.

FIG. 3 shows a second embodiment of the structure of a display device in accordance with the invention.

The aim of this embodiment is that an observer standing on the left see either 3D content generated by the display or can see the scenery on the right side undisturbed. The display can be switched between these modes. An observer standing on the right can either see the scenery on the left undisturbed or will see a black screen (as will be clear from the explanation below). This embodiment furthermore offers the possibility to deliver ordinary 2D content at the original resolution to users standing on both sides, although one side will be the mirror image of the other side.

A typical application of this embodiment can again be an interactive shop window, a public information display, an interactive advertisement display, or a transparent computer screen.

The elements of this embodiment are almost exactly the same as for the embodiment of FIG. 1. The same components are given the same reference numbers. The differences reside in the pixel structure.

The lens structure is again shown as designed to lens state A and pass state B and the non-switchable polarizer 18 transmits state B.

One important difference of this embodiment compared is that the pixels are now directly next to each other, with a spacing between them that is typical for a regular display so that the display output area is more than 60% of the display area (or even more than 70%). This allows for more views in 3D mode and loosens the restrictions on the light output of each individual pixel as it can span a larger area. This requires the pixels themselves to be transparent. Transparent display technologies are well known, for example using transparent ITO for the pixel electrodes.

The pixel is thus made of a transparent emitter 40, such as a transparent OLED, sandwiched between two switchable polarisers 42. The state of the switchable polarisers is coupled to the state of the transparent OLED as shown below.

Just as for the first embodiment, the polariser 18 transmits a polarisation that is not refracted by the lens structure. When the structure is to be used in a see-through mode, the switchable polarisers 42 are switched to transmit the same polarisation as the polariser 18. To use the structure in 3D mode, the switchable polarisers 42 are set to transmit the orthogonal polarisation.

Figure 4:
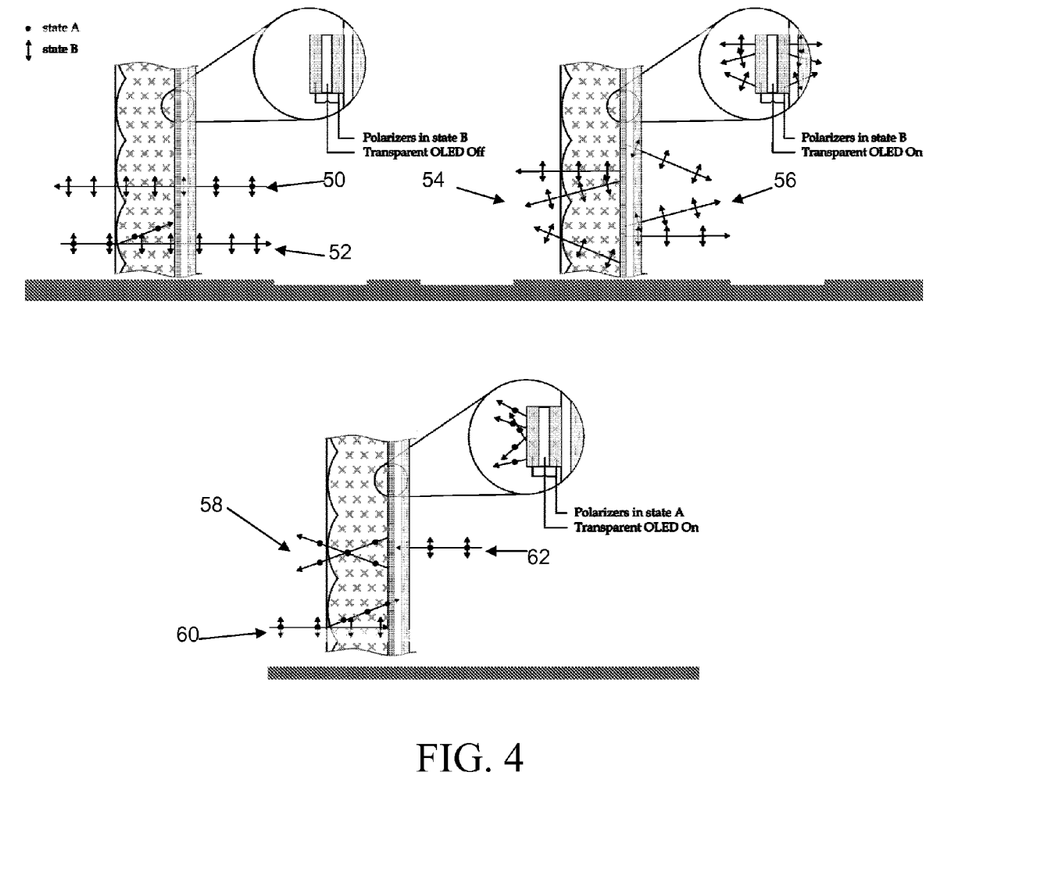
FIG. 4 shows the different modes of operation of the device of FIG. 3.

FIG. 4 shows the operation of the device as a see through display without any content (top left) and with 2D generated content to both sides of the display (top right) and with 3D content to one side only (bottom).

When the transparent OLED pixels are placed in a transparent state and the switchable polarisers transmit polarisation state B, the display acts as an ordinary transparent screen allowing rays 50 and 52 to propagate undisturbed through the display. This is the see-through mode.

If the transparent OLED pixels are turned on and emit light, the pixels will only emit light in polarisation state B (as a result of the switchable polarizers surrounding the pixel emission layer) towards both the left, rays 54, and right side, rays 56. This polarisation can propagate undisturbed through the birefringent lenticular lens and its replica thereby creating ordinary 2D content. Also on the right side of the structure the 2D content is visible (although mirrored).

In the 3D mode, the switchable polarisers 42 are set to transmit state A and the transparent OLED pixels are turned on. The pixels only emit light in polarisation state A (as a result of the switchable polarizers surrounding the pixel emission layer). Light propagating to the right will be absorbed by the non-switchable polariser 18. Light propagating to the left, rays 58, will be refracted by the birefringent lens thereby generating views as in a conventional autostereoscopic display.

Light from outside the display, rays 60 from the left and 62 from the right, cannot propagate through the display and will be absorbed or reflected by at least one of the polarizers 18 or 42.

By spatially addressing the switchable polarisers, it is possible to selectively make different parts of the display 2D, 3D, or see through.

The embodiments above can be implemented with parallax barriers instead of lenticular lenses. Ordinary parallax barrier would however cause a disturbed view of the image transmitted through the display. For the best performance therefore, the barriers can be formed as polarisers.

If the state of the barrier polariser is chosen to be equal to the state of polariser 18, light transmitted through the display can travel undisturbed to an observer, while for the content created by the pixels 14 the observer can sees them through a parallax barrier.

Figure 5:
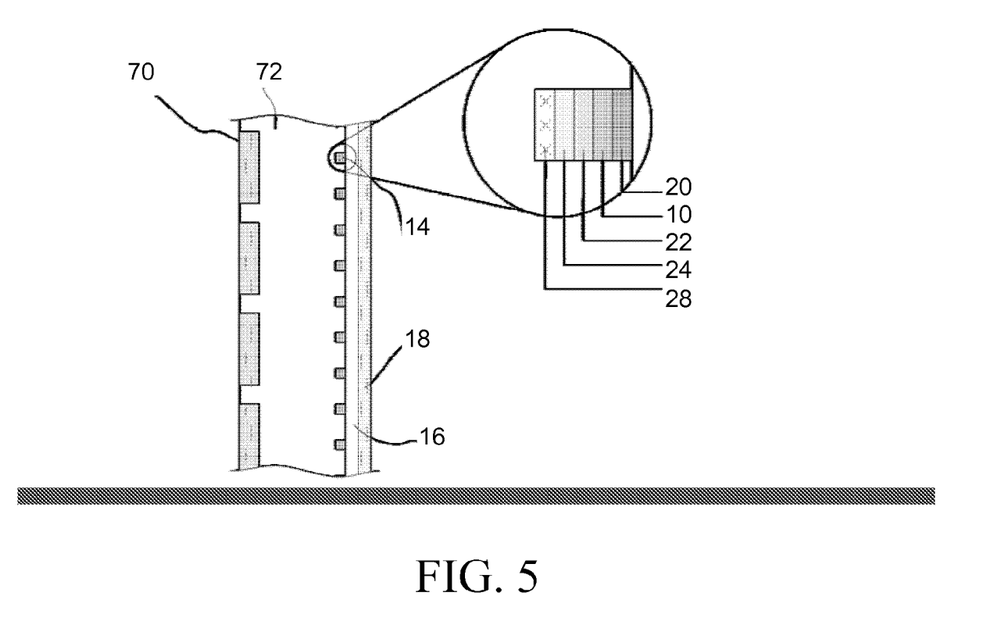
FIG. 5 shows a third example of display device according to the invention.

FIG. 5 shows an implementation of the system shown in FIG. 1 using parallax barriers.

The same references are again used as in FIG. 1.

The birefringent lens and the replica have been replaced with a parallax barrier. The parallax barrier consists of polarizers 70 on top of a spacer 72. The polarizers 70 transmit the same polarization state as polarizer 18.

The same substitution of the lens and replica with the polarizing barrier and spacer can be implemented to the example of FIG. 3.

The invention is of interest for transparent 3D displays, for example for use as an interactive shop window, a public information display, or an interactive 3D advertisement display.

It will be apparent from the above that the display only transmits one polarization state, so that typically half of the ambient light is blocked thereby reducing the brightness when looking through the display.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

Any reference signs in the claims should not be construed as limiting the scope.

The invention claimed is:

1. A display device comprising:
   an emissive display panel comprising a display output face and a rear face, wherein light emissive display pixels are disposed between the display output face and the rear face;
   a polarization-sensitive view forming arrangement over the display output face,
      wherein the view forming arrangement directs light of a first polarization from different pixels into different directions thereby enabling multiple views to be displayed in different directions simultaneously,
      wherein the view forming arrangement passes light of a second polarization that is orthogonal to the first polarization without significant change of direction; and
   a polarization filter arranged on the rear face,
      wherein the polarization filter blocks light of the first polarization and passes light of the second polarization; and
   wherein the display device has at least two modes of operation:
      a first, see-through mode of operation in which the display panel does not emit light and the display device blocks the light of the first polarization but allows light of the second polarization to pass through in both opposite directions through the display device; and
      a second, 3D display mode in which the emissive pixels output light of the first polarization from the display output face and the view forming arrangement forms the multiple views.

2. A device as claimed in claim 1, wherein a total pixel area is less than 50% of a total display area.

3. A device as claimed in claim 2, wherein the pixels comprise an output polarizer for blocking light of the second polarization.

4. A device as claimed in claim 2, wherein the view forming arrangement comprises a lenticular lens arrangement having birefringent lens elements and a replica arrangement arranged such that a lensing function is provided at the lens element and replica interface only for light of the first polarization.

5. A device as claimed in claim 2, wherein the view forming arrangement comprises an arrangement of barrier elements, wherein the barrier elements are formed as polarizers which block light of the first polarization.

6. A device as claimed in claim 1, wherein a total pixel area is more than 60% of a total display area, and wherein the display panel comprises switchable polarizers on each side of a light emissive layer.

7. A device as claimed in claim 6, wherein in the first, see-through mode of operation, the switchable polarizers block light of the first polarization; and wherein in the second, 3D display mode, the switchable polarizers block light of the second polarization.

8. A device as claimed in claim 7, wherein the display device has a third, dual direction 2D mode of operation, in which the switchable polarizers block light of the first polarization and the display panel is controlled to display a single 2D image.

9. A device as claimed in claim 6, wherein the view forming arrangement comprises a lenticular lens arrangement having birefringent lens elements and a replica arrangement, arranged such that a lensing function is provided at the lens element and replica interface only for light of the first polarization.

10. A device as claimed in claim 6, wherein the view forming arrangement comprises an arrangement of barrier elements, wherein the barrier elements are formed as polarizers which block light of the first polarization.

11. A device as claimed in claim 1, wherein one of the first and second polarizations comprises linearly horizontally polarized and the other comprises linearly vertically polarized.

12. A device as claimed in claim 1, wherein one of the first and second polarizations comprises clockwise circularly polarized and the other comprises counter-clockwise circularly polarized.

13. A device as claimed in claim 1, wherein the emissive display panel comprises a light emitting diode display panel.

14. A method of operating a display device, the device comprising:
an emissive display panel comprising a display output face and a rear face, wherein light emissive display pixels are disposed between the display output face and the rear face;
a polarization-sensitive view forming arrangement over the display output face,
wherein the view forming arrangement directs light of a given first polarization from different pixels into different directions thereby enabling multiple views to be displayed in different directions simultaneously,
wherein the view forming arrangement passes light of a second polarization that is orthogonal to the first polarization without a significant change of direction; and
a polarization filter arranged on the rear face,
wherein the polarization filter blocks light of the first polarization and passes light of the second polarization,
wherein the method comprises at different times operating the display device in at least two modes of operation:
a first, see-through mode of operation in which the display panel does not emit light and the display device blocks the light of the first polarization but allows light of the second polarization to pass through in both opposite directions through the display device; and
a second, 3D display mode in which the display panel outputs light of the first polarization from the display output face and the view forming arrangement forms the multiple views.

* * * * *